United States Patent [19]

Haller

[11] 3,898,999

[45] Aug. 12, 1975

[54] VALVE HAVING AXIALLY SEPARABLE MEMBERS

[76] Inventor: Jordan D. Haller, 2701 W. Alameda Ave., Burbank, Calif. 91505

[22] Filed: July 25, 1974

[21] Appl. No.: 491,792

Related U.S. Application Data

[62] Division of Ser. No. 307,351, Nov. 17, 1972, Pat. No. 3,839,741.

[52] U.S. Cl.................................. 137/512.1; 3/1.5
[51] Int. Cl.²..................... F16K 15/08; A61F 1/22
[58] Field of Search....................... 3/1, DIG. 3, 1.5; 137/512.1, 512.2, 513, 799

[56] References Cited
UNITED STATES PATENTS

| | | | |
|---|---|---|---|
| 3,378,029 | 4/1968 | Lee | 3/1 X |
| 3,579,642 | 5/1971 | Heffernan et al. | 3/1 |

FOREIGN PATENTS OR APPLICATIONS

| | | | |
|---|---|---|---|
| 76,702 | 8/1894 | Germany | 137/512.2 |
| 1,523,744 | 3/1968 | France | 3/DIG. 3 |
| 482,441 | 12/1969 | Switzerland | 3/DIG. 3 |

OTHER PUBLICATIONS

"The In Vivo Comparison of Hemodynamic Function of Ball, Disk, and Eccentric Monocusp Artificial Mitral Valves" by R. W. M. Frater et al., *Prosthetic Heart Valves* (Book), Charles C. Thomas, publisher, 1968, pp. 262–277.

*Primary Examiner*—Ronald L. Frinks
*Attorney, Agent, or Firm*—Larson, Taylor and Hinds

[57] ABSTRACT

An arrangement for retaining a heart valve in a passageway of a cardiovascular system, and a heart valve useable therewith. The retaining arrangement includes an annular arrangement surrounding the circular heart valve and engaging it so as to be radially expandable and contractable relative thereto while securely holding the heart valve in place. The annular arrangement may include a single overlapping loop or a plurality of arcuate segments, all of which could slidingly engage a circumferentially extending flange on the outside of the heart valve. The heart valve includes a plurality of circular elements interfitting in a single plane to close the valve and extending axially relative to each other to open the valve and hence permit fluid flow through the passageway.

11 Claims, 12 Drawing Figures

PATENTED AUG 1 2 1975  3,898,999

SHEET 2

VALVE HAVING AXIALLY SEPARABLE MEMBERS

This is a division of application Ser. No. 307,351, filed Nov. 17, 1972, now U.S. Pat. No. 3,839,741.

BACKGROUND OF THE INVENTION

This invention relates to a prosthetic device, and in particular it relates to a valve structure useable as a heart valve; and this invention also relates to a retaining means for adjustably securing a heart valve in a passageway of a cardiovascular system.

Many forms of heart valves are currently known and used. For example, one such device is shown in the Lee U.S. Pat. No. 3,378,029, which shows a heart valve having a plurality of nested circular elements. However, in view of the extremely specialized and highly delicate nature of the use to which a heart valve is put, there is a continuing need for new and improved valve structures therefor.

Heart valves generally include a substantially fixed outer support part to which a suitable fabric such as a Dacron or Teflon fabric is attached, this fabric serving as the means for connecting the heart valve to the walls of the passageway. However, while these support parts have generally been fixed elements, the systems in which they are used are dynamic parts, i.e., passages in the heart which expand and contract each time that the heart beats. Also, the heart shrinks in size following reparative surgery. This conflict between the dynamic nature of the cardiovascular system and the static nature of the conventional heart valve support means creates problems, the solutions to which the present invention is directed.

SUMMARY OF THE INVENTION

Thus, it is a purpose of this invention to provide a new and improved prosthetic structure for the cardiovascular system which improves upon and solves problems associated with structures known heretofore.

The present invention provides a new and improved means for retaining a heart valve of any construction in the passageway of a cardiovascular system. According to the invention, the connecting means is an annular arrangement surrounding the heart valve and so connected to the heart valve that it is permitted to expand and contract radially while at the same time it is capable of being positively secured to the walls of the passageway. A cloth is connected to the outer periphery of the annular arrangement and the cloth is sutured to the walls of the passageway.

Within this basic structure, the annular arrangement can have many different forms. The heart valve will preferably have formed on the outer circumference thereof an outwardly extending circumferential flange to which the annular arrangement would be attached for sliding movement both circumferentially therealong and radially relative thereto. In a preferred embodiment, the annular arrangement will comprise a plurality of arcuate segments, each having a slot on its inner periphery to engage said flange. Of course a circumferential space will be provided between adjacent segments permitting them to move radially relative to the heart valve. The segments may be interconnected circumferentially by means which permit relative circumferential sliding movement or the circumferential engagement of the segments may simply be provided by the cloth fabric referred to above which will extend in a continuous circle all about the outer periphery of the annular arrangement. The cloth should have a degree of elasticity so that it could stretch and relax circumferentially as the segments moved radially outwardly and inwardly respectively.

In another embodiment, the annular arrangement may take the form of a single loop which overlaps itself and is thus capable of increasing and decreasing the extent of overlap so as to expand and contract radially relative to the heart valve.

With the above described heart valve retaining means, it is now possible to secure the heart valve in place during the operative procedure, after which the overall dimensions of the heart valve (i.e., the heart valve and its retaining means) will shrink in size concurrently as the heart shrinks in size following surgery. This has the advantage of minimizing pressure on the conduction system on the heart and thus reducing the possibility of subsequent arrhythmias. In addition, this will minimize the possibility of the sutures tearing out by the gradual shrinkage of the heart, which might be the case if the overall heart valve structure were completely fixed relative to the dynamic, shrinking heart. Further, the normal action of the heart includes expansion and contraction and by allowing motion of the valve during this normal cardiac cycle, the possibility is reduced of the sutures tearing out until such time as the valve is anchored to the passage walls by the ingrowth of fibrous tissues.

While the heart valve retaining means is usable with essentially any type of heart valve, the present invention also provides a new and improved heart valve structure capable of being used in combination with the new and improved annular retaining means or separately therefrom.

According to the preferred embodiment, this new heart valve structure comprises a plurality of circular and ring shaped segments which, in the closed condition interfit with each other in a single plane, and which in an expanded condition separate from each other axially to an extent permitted by retaining struts to permit fluid to flow therethrough. This structure provides several advantages. First, in the closed condition the valve is rather compact since all elements lie in a single plane. Secondly, the structure is such that a good seal may be formed between the individual elements of the valve in the closed condition. Further, in the open condition the elements can separate from each other a relatively large distance, thus permitting free flow of fluid therethrough. Moreover, the valve structure provides a unique combination of ruggedness and flexibility. This is so because the individual valve elements are plates which can be formed of a strong metal material containing the retaining struts to interconnect them in the open condition, and the various ring elements can turn out of their normal transverse planes, thus permitting a certain degree of flexibility. In a preferred arrangement, these struts would be made integral with their respective plates.

Thus, it is an object of this invention to provide a new and improved prosthetic device for the cardiovascular system.

It is another object of this invention to provide a new and improved heart valve retaining means which is capable of undergoing radial expansion and contraction.

It is still another object of this invention to provide a new and improved valve retaining means having a plurality of arcuate segments arranged annularly around the valve for connecting the valve to the passageway in the cardiovascular system, the annular arrangement being movable radially.

It is another object of this invention to provide a new and improved heart valve having a plurality of circular or ring shaped elements which, in the closed position, lie in a common plane, and which in the open position, separate axially from each other to an extent permitted by struts.

It is still another object of this invention to provide a new and improved heart valve having a plurality of circular or ring shaped elements movable between an open position and a closed position in combination with a radially adjustable annulus for connecting the heart valve to the passageway of the cardiovascular system.

Other objects and the advantages of the invention will become apparent from the detailed description to follow together with the accompanying drawings.

BRIEF DESCRIPTION OF THE DRAWINGS

There follows a detailed description of preferred embodiments which are to be read together with the accompanying drawings.

DETAILED DESCRIPTION OF THE PREFERRED EMBODIMENT

Figure 1:
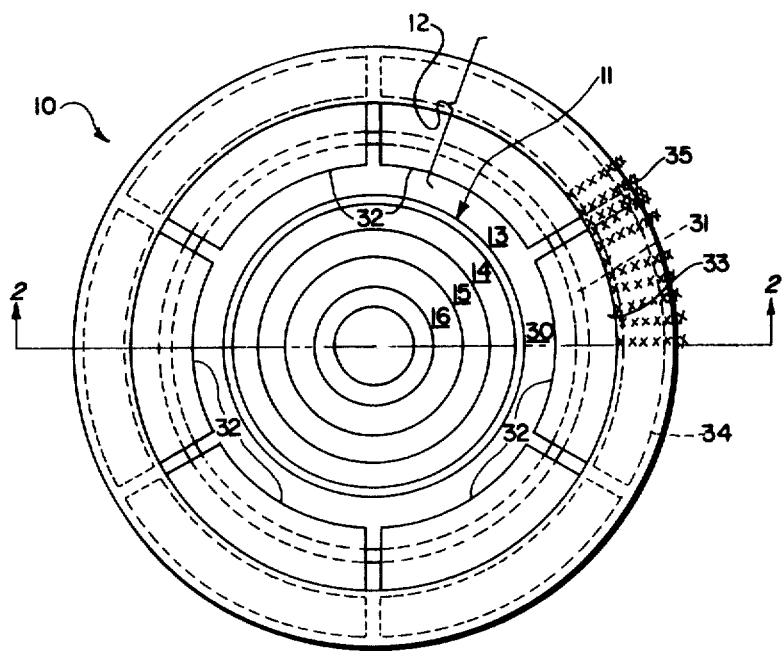
FIG. 1 is a plan view of a heart valve constructed in accordance with the present invention in combination with an adjustable annular retaining means therefor.

Referring now to the drawings, like elements are represented by like numerals throughout the several views.

FIGS. 1-4 show a heart valve assembly 10 having a heart valve 11 in combination with an expandable annular retaining means 12.

Figure 2:
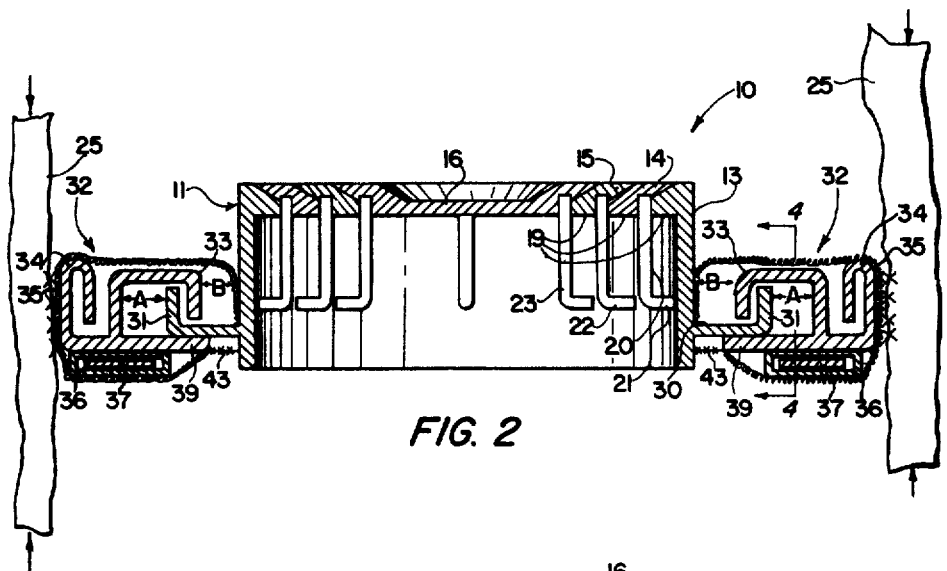
FIG. 2 is a cross-sectional view taken along line 2—2 of FIG. 1.
Figure 3:
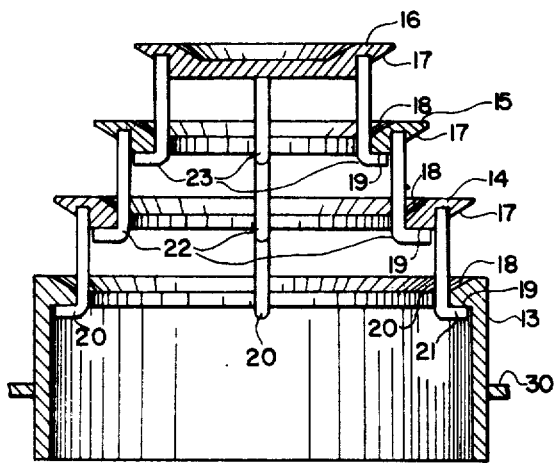
FIG. 3 is a cross-sectional view similar to FIG. 2 but showing the valve elements in the valve-opened condition and excluding the adjustable annular retaining structure.

Referring in particular to FIGS. 2 and 3, the heart valve 11 comprises a cylindrical outer ring 13, intermediate annular rings 14 and 15, and an inner circular element 16. Each of elements 14, 15 and 16 have a bev- elled frustro-conical outwardly facing surface 17 and each of elements 13, 14 and 15 have inwardly facing frustro-conical surfaces 18. As is apparent in FIG. 2, in the closed condition of the valve, facing surfaces 17 and 18 engage each other to seal the passageway in which the valve is located. Each one of the elements 13, 14 and 15 includes a lower annular shoulder 19. In turn, each of the elements 14, 15 and 16 has fixed thereto a plurality of struts 20, 22, and 23, respectively, which struts extend downwardly from the element with which it is connected and then outwardly as shown at 21 for the righthand element 20 in FIGS. 2 and 3 to engage the shoulder 19 of the element immediately beneath it. In this manner, the struts limit the upward and hence the opening movement of the valve.

In practice, the valve must of course assume any orientation and of course it does not depend on gravity to open and close. In practice, pressure on the upstream side of the valve (the lower part in FIGS. 2 and 3) would open the valve, and then a pressure differential in the opposite direction during another part of the cardiac cycle would close the valve.

Figures 4, 5:
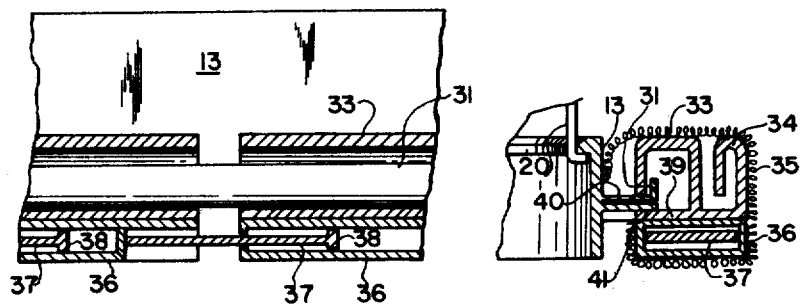
FIG. 4 is an enlarged, partial sectional view taken along line 4—4 of FIG. 2.
FIG. 5 is a cross-sectional view similar to the righthand side of FIG. 2 but showing a modification of the invention.

In FIG. 2, the walls of the passageway in which the valve is located is designated by 25. In FIG. 2, the flow would be in the upward direction. Referring now to FIGS. 1, 2 and 4, the valve is secured in the passageway 25 by the adjustable annular retaining means in the following manner. A flange 30 projects outwardly from the outer ring 13 and extends continuously around the valve and includes an upwardly extending lip 31. In this embodiment, the annular retaining means comprises a plurality of arcuate segments 32, each of which includes an inner cavity 33 for receiving the lip 31 of the flange 30 in such a manner that the segment 32 can move radially relative to the flange 30. The segment 32 also includes an outer element 34, the purpose of which is to secure to the segment 32 a cloth 35 of fabric or the like. As shown in FIG. 1, this cloth 35 will extend circumferentially completely around the annular retaining means 13, even across the spaces between adjacent segments. The annular retaining means 12 is then connected to wall 25 by means of sutures secured to the fabric 35 in a manner known per se, and it also extends from wall 25 radially inwardly to completely cover the means 12. It is connected above to the outside of ring 13 and below to the radial inner side of bottom wall 39.

The segments 32 are probably adequately supported in all directions by their engagement with the flange 30 and lip 31. However, to further guide these elements 32 in their relative movement, guiding means 36–38 may be provided. This guiding means includes an elongated hollow slot 36 attached to each segment 32, each slot 36 having fixed thereto a rod 37 extending into the slot 36 of the adjacent segment and including at its end a head 38 engageable in said adjacent slot 36. See FIG. 4.

Means must be provided for preventing fluid flow through the expandable annular retaining means when the valve is in the closed position, i.e., around the flange 30 or between the segments 32. For this purpose, a suitable flexible waterproof material can be connected to the two facing ends of adjacent segments 32 and also from the lower end of element 13 across to the bottom wall 39 of the segment 32 as shown at 43 in FIG. 2. In lieu of element 43, the flange 30 can of course engage the bottom wall 39 in a tight watertight manner.

FIG. 5 shows a modification of the invention wherein the flange 30 is replaced by a spring loaded flange 40 which has a lower portion spring biassed downwardly against bottom wall 39 at point 41. This provides a scraping action of the bottom wall 39 and prevents thrombus formation of the components until final closure is established. In addition, this can of course provide the fluid tight seal preventing fluid to flow through the annular retaining means 12 when the valve is in the closed position.

Figure 6:
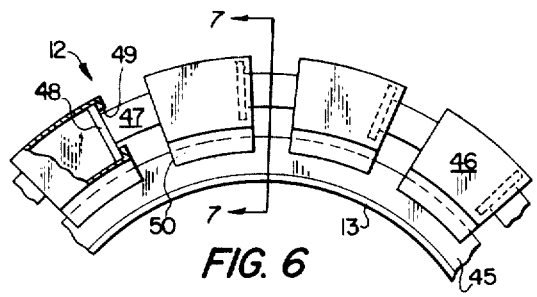
FIG. 6 is a plan view showing a portion of a modified annular valve retaining means.
Figure 7:
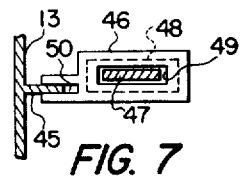
FIG. 7 is a cross-sectional view taken along line 7—7 of FIG. 6.
Figure 8:
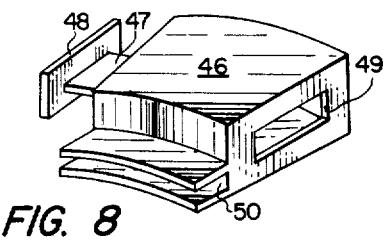
FIG. 8 is a perspective view of an element of FIGS. 6 and 7.

FIGS. 6–8 show another modification of the annular retaining means 12. In this case, only the outer ring 13 of the valve 11 is shown and the flange 30 is replaced by a simple flange 45 which does not have a lip 31. In this embodiment, each of the arcuate segments 46 include a rod 47 integral therewith and projecting circumferentially therefrom and having at its outer end an enlarged head 48. On its opposite circumferential side, the segment 46 includes an opening 49 large enough to receive rod 47, but not large enough to receive head 48. On its radial inner side, the segment 46 includes a slot 50 adapted to receive the flange 45. In the same manner as in the embodiment of FIGS. 1–5, a fabric material such as Dacron or Teflon surrounds and is attached to the outer periphery of the segments 46 for attaching the valve means to the walls of passageway 25.

Figure 9:
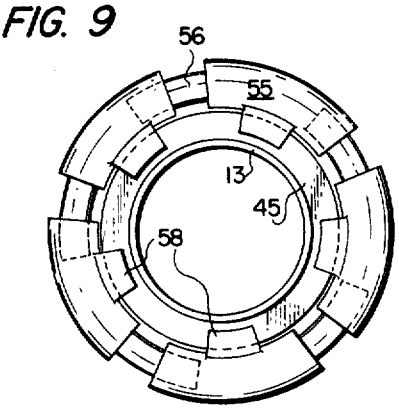
FIG. 9 is a plan view similar to FIG. 1 but omitting the valve itself and showing a modified structure of the annular valve retaining means.
Figure 10:
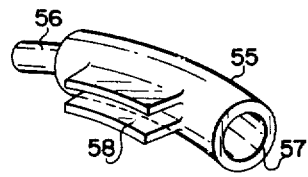
FIG. 10 is a perspective view of an element of FIG. 9.

The embodiment of FIGS. 9–10 is similar to the embodiment of FIGS. 6–8 except that the shape of the individual segments is somewhat changed. In this case, the arcuate segments 55 are cylindrical and include at one end a circular arcuate rod 56 which does not have an enlarged head but which is adapted to fit through the opening 57 on the adjacent arcuate segment. Slot 58 is provided on the radial inner facing surface to engage flange 45, and a fabric ring surrounds the outer periphery of the segments 55.

Figure 11:
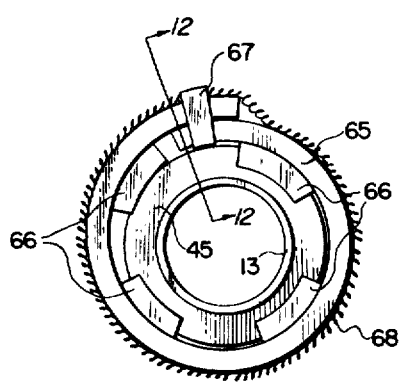
FIG. 11 is a plan view similar to FIG. 1 but omitting the valve structure and showing a modification of the annular valve retaining means.
Figure 12:
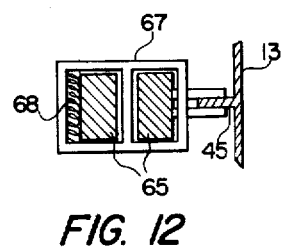
FIG. 12 is a cross-sectional view taken along line 12—12 of FIG. 11.

In the embodiment of FIGS. 11 and 12, a single element 65 extends completely around the valve means and overlaps itself loosely through a harness 67 which permits the element 65 to decrease and increase its overlap, thus expanding and contracting, radially, respectively. A plurality of inwardly facing slots 66 engage flange 45 and a fabric ring 68 completely surrounds the element 65 for attaching the same to the walls of passage 25.

In all of the embodiments, it will therefore be seen that the expandable annular retaining means 12 is capable of limited radial expansion and contraction relative to the valve member itself. Thus, in operation the valve with an adjustable annular retaining means can be inserted into a passage in the cardiovascular system during which time the passage will be enlarged. Then, following surgery, as the passage shrinks, the annular retaining means will also contract, moving inwardly as the individual segments move closer together. For example, in the embodiment of FIGS. 1 and 2, the means 12 is shown in its radial outer position. Note the space A between the lip 31 and the outer side of cavity 33 and a similar space B between the inner wall of cavity 33 and the element 13. Also note in FIG. 1 that the segments 32 are spaced apart from each other circumferentially. The assembly 10 might be installed in the passageway 25 in this manner. Then, in the course of time, the passageway 25 would shrink and the means 12 would move radially inwardly, the cavities 33 moving in on the flange 30 as the spaces A and B reduce in size. Thus, contrary to the prior art wherein such shrinkage would cause a stress where the wall engaged the support, in this case the wall can simply shrink, moving with it the valve retaining means. The valve retaining means would be so dimensioned that even after shrinkage had been completed, the spaces A and B would not be completely eliminated, i.e., the element 13 would not touch the element 33. This would leave some leeway for the means 12 to expand and contract as the passageway 25 expanded and contracted during the normal cardiac cycle without tearing the valve from its sutures anchoring the fabric 35 to the walls of passageway 25.

In the preferred embodiment of the valve 11, the structural elements 13, 14, 15 and 16 would be made entirely of steel containing struts. In a normal useage of the present invention, a total change in diameter of approximately three to four millimeters would be sufficient for preventing the sutures from being torn.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A valve comprising an outer annular retaining means for retaining the valve in a passageway, said annular retaining means including a plurality of individual segments, a valve body comprising a plurality of concentric ring shaped elements and a central circular element, means interconnecting said outer annular retaining means and the outermost ring shaped element, means interconnecting the elements of said valve body to limit the degree of separation thereof, and said annular retaining means being constructed to expand and contract radially, said means interconnecting the outer annular retaining means and the outermost ring shaped element comprising an outwardly extending flange on the outermost ring shaped element and a slot in each of said segments of said outer ring for receiving said flange, the flange and slot interengaging so as to permit said radial movement of the segments of the annular retaining means relative to the flange.

2. A valve according to claim 1, wherein said means interconnecting the elements of said valve body includes struts mounted on each of said valve body elements, said struts having end portions engaging adjacent elements.

3. A valve comprising:
an outer ring member adapted to be secured within a passageway,
a central member and concentric ring members of progressively larger diameter surrounding the central member, the outermost concentric ring member being surrounded by the said outer ring member,
all said members interfitting with each other to close off the passageway in a first end position of axial movement of said members,
said central member and concentric ring members being movable to a second end position with the central member fartherest, in an axial direction of fluid flow from the outer ring member and with the concentric ring member staggered axially, largest to smallest, respectively, from the outer ring member to the central member, to open the valve, thin struts connected to each of the central member and concentric ring members and extending axially upstream from its respective member and operatively engaging the upstream side of a larger diameter member to limit axial movement of its respective member at the second end position, said struts being of sufficiently small cross-section that they offer minimal resistance to the flow of fluid through the open valve, and said struts being long enough in the axial direction to permit its respective member to be spaced axially in the direction of fluid flow from the downstream end of the next larger member, thus providing between adjacent members an annular, substantially unobstructed opening for fluid flow, wherein, at said open position, the interior of the valve within the staggered central member and concentric ring members defines a generally frustro-conical space in open communication at its larger base with the upstream side of the valve and in open communication with the downstream side of the valve through substantially unobstructed annular openings between the adjacent, spaced apart members.

4. A valve according to claim 3, said struts being thin elongated elements much thinner in cross-section than their length, said elongated elements extending axially from their respective members, toward an upstream direction and having an essentially right angle turned outwardly to engage a larger member at the open position of the valve.

5. A valve according to claim 4, said turned portions of the struts engaging the next adjacent member.

6. A valve according to claim 3, said struts being thin elongated elements operatively engaging an upstream member with sufficient looseness in the transverse direction to permit each member to undergo limited turning movement out of its normal transverse plane.

7. A valve according to claim 3, the mating edges of said members being beveled radially outwardly in the direction of flow to thereby provide said openings with streamline boundaries in the direction of flow out of the said space to the downstream side of the valve.

8. A valve according to claim 3, said members lying in a common plane transverse to the direction of fluid flow in the closed position of the valve.

9. A valve according to claim 8, said mating edges of said members being bevelled radially outwardly in the direction of fluid flow, said bevelled edges engaging each other in the closed position of the valve.

10. A valve according to claim 3, said central member and concentric ring members being in the shape of generally flat discs.

11. A valve according to claim 10, the mating edges of said disc shaped members being bevelled radially outwardly in the direction of fluid flow to thereby provide said openings with streamline boundaries in the direction of fluid flow out of the said space to the downstream side of the valve.

* * * * *